United States Patent [19]  [11] 4,340,690
Lal et al.  [45] Jul. 20, 1982

[54] CYCLIC ORGANO CARBONATE AND SULFITE COUPLING AGENTS FOR LIVING POLYMERS OF CONJUGATED DIENES

[75] Inventors: Joginder Lal, Akron; Michael L. Senyek, Tallmadge, both of Ohio

[73] Assignee: The Goodyear Tire & Rubber Company, Akron, Ohio

[21] Appl. No.: 277,320

[22] Filed: Jun. 25, 1981

Related U.S. Application Data

[62] Division of Ser. No. 153,121, May 27, 1980, Pat. No. 4,301,258.

[51] Int. Cl.$^3$ ............................................. C08F 297/04
[52] U.S. Cl. .................................... 525/271; 525/248; 525/250; 525/256; 525/261; 525/262; 525/292; 525/314
[58] Field of Search ............... 525/314, 256, 261, 262, 525/248, 250, 271, 272, 292

[56] References Cited

U.S. PATENT DOCUMENTS

| | | | |
|---|---|---|---|
| 3,594,452 | 7/1971 | De La Mare | 525/386 |
| 3,598,887 | 8/1971 | Darcy et al. | 525/271 |
| 3,639,519 | 2/1972 | Hsieh et al. | 525/271 |
| 3,651,025 | 3/1972 | Bean et al. | 525/386 |
| 4,049,753 | 9/1977 | Moczygemba | 525/314 |
| 4,238,576 | 12/1980 | Trepka | 525/272 |
| 4,301,258 | 11/1981 | Lal et al. | 525/334 |
| 4,301,259 | 11/1981 | Lal et al. | 525/334 |
| 4,308,364 | 12/1981 | Udipi et al. | 525/314 |

FOREIGN PATENT DOCUMENTS 992210 5/1965 United Kingdom .

Primary Examiner—William F. Hamrock
Attorney, Agent, or Firm—J. Y. Clowney

[57] ABSTRACT

New compositions and a process for the preparation of conjugated diene polymers of broadened molecular weight distribution by reacting non-terminated lithium catalyzed conjugated diene polymers with cyclic organic compounds selected from the group of carbonates, thiocarbonates and sulfites. The resulting new compositions are suitable for use in making high impact plastics and for fabricating rubber goods.

10 Claims, No Drawings

CYCLIC ORGANO CARBONATE AND SULFITE COUPLING AGENTS FOR LIVING POLYMERS OF CONJUGATED DIENES

This is a division, of application Ser. No. 153,121 filed May 27, 1980 now U.S. Pat. No. 4,301,258.

FIELD OF THE INVENTION

This invention relates to new compositions and to a method of preparing branched polymers of conjugated dienes or branched block copolymers of vinyl-substituted aromatic compounds and conjugated dienes, which possess one or more of the following attributes: broadened molecular weight distribution, enhanced Mooney viscosity, negligible cold flow, increased styrene solution visosity and good processability. This is accomplished by reacting organoalkali metal or organomagnesium catalyzed non-terminated polymers or block copolymers of conjugated dienes with cyclic organic compounds selected from the group of cyclic organic carbonates, cyclic organic thiocarbonates and cyclic organic sulfites. In the case of these cyclic carbonates, thiocarbonates and sulfites a ring-opening reaction of the cyclic compound occurs during the coupling process. This reaction is designated as ring-opening coupling.

BACKGROUND OF THE INVENTION

U.S. Pat. No. 3,135,716 teaches the preparation of terminally reactive polymers through the reaction of living (i.e. non-terminated) polymers with reagents such as oxygen, sulfur, halogen, sulfuryl chloride, carbon disulfide, carbon, dioxide, and carbonyl chloride.

U.S. Pat. No. 3,598,887 teaches a process for making multi-block copolymers by coupling living block copolymers with carbon dioxide, carbonyl sulfide, or carbon disulfide.

U.S. Pat. No. 3,281,383 teaches a method of making a branched polymer by reacting a mono-lithium non-terminated polymer with a compound having at least three reactive sites capable of reacting with the carbon-lithium bond to produce a "radial" polymer, i.e. a polymer having long chain branches. The types of treating compounds used included polyepoxides, polyisocyanates, polyimines, polyaldehydes, polyketones, polyanhydrides, polyesters, and polyhalides.

U.S. Pat. No. 3,349,071 teaches a process for reducing the cold flow of diene polymers by terminating lithium catalyzed diene polymers with carbon disulfide.

U.S. Pat. No. 3,427,364 teaches a process for preparing polymers of increased molecular weight by reacting lithium catalyzed non-terminated homopolymers and copolymers of conjugated dienes and mono-vinyl arenes with carbon monoxide as a coupling agent.

In the *Journal of Polymer Science*, A-1, 6 859 (1968) there is reported the use of diethylcarbonate in an attempt to couple "living" lithium polystyrene for the formation of a ketone-containing polymer i.e.,

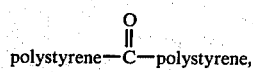

which could be further used for a grafting reaction. With "living" lithium polystyrene of viscosity average molecular weight, $\overline{M}v$, of 31,500 and an equivalent amount of diethyl carbonate, there was obtained a very modest increase in $\overline{M}v$ to 42,800. However, the fractionated polymer from the diethyl carbonate reaction yielded very little graft polymer and therefore, it was concluded in this article that diethyl carbonate was ineffective as a coupling agent. The product resulting from the reaction of "living" lithium α-methylstyrene polymer of $\overline{M}v=31,500$ and diethyl carbonate had $\overline{M}v=29,200$, representing no coupling. No mention is made of conjugated diene polymers in this article, nor are any additional data or discussion given which would even suggest that diethyl carbonate could function successfully as a coupling agent for broadening the molecular weight distribution of "living" lithium polydienes.

The present invention of ring-opening coupling of cyclic organic carbonates, thiocarbonates, and sulfites by reaction with living polymers of conjugated dienes is quite novel and yields new compositions and a process for making conjugated diene polymers having one or more of the following: broadened molecular weight distribution, enhanced Mooney viscosity, negligible cold flew, and better processability. In another aspect, it relates to a process for preparing branched block copolymers having a broadened molecular weight distribution and negligible cold flow. During packaging, shipping and storage of elastomeric hydrocarbon polymers, the tendency of these materials to undergo cold flow in the unvulcanized state can present severe handling difficulties. If a package of polymer is punctured, the resulting polymer can flow out, leading to product loss, contamination, or sticking of the packages together. Furthermore, hydrocarbon polymers of conjugated dienes of relatively high Mooney viscosities are frequently difficult to process. Their low Mooney viscosity counterparts on the other hand have a tendency to cold flow in the uncured state. This restricts the use of hydrocarbon polymers of conjugated dienes in the manufacture of high impact plastics, such as polystyrene. Linear polybutadienes frequently do not possess the necessary combination of rheological and viscosity properties such as Mooney viscosity, styrene solution viscosity, and cold flow needed in the manufacture of reinforced polystyrene.

We have discovered that ring-opening coupling of cyclic organic carbonates, cyclic thiocarbonates, or cyclic organic sulfites by reaction with organolithium catalyzed non-terminated conjugated diene polymers produces new polymers possessing broadened molecular weight distribution, greatly increased molecular weight, enhanced Mooney viscosities, negligible cold flow and greater styrene solution viscosities compared to the untreated polymers. The polymers resulting from our invention possess the desirable processing properties so necessary for conjugated diene polymers used in the manufacture of reinforced polystyrene and for making rubber goods such as tires, conveyor belts and hose.

Although the use of only organolithium initiators for synthesizing non-terminated polymers has been shown in the experimental portion, the scope of the invention covers the use of other organoalkali metal and organomagnesium initiators.

The microstructures of the polymers prepared from conjugated dienes may be modified by employing polar compounds, known in the art, during polymerization. Some examples of polar compounds are: diglyme (dimethyl ether of diethylene glycol), tetrahydrofuran, triethylamine, and N,N,N',N'-tetramethylethylene diamine.

SUMMARY OF THE INVENTION

One aspect of the invention is a process for the preparation of block copolymers of vinyl-substituted aromatic compounds and conjugated dienes of broadened molecular weight distribution comprising:

(a) polymerizing a vinyl-substituted aromatic compound in the presence of an initiator selected from organoalkali metal or organomagnesium initiators until the consumption of the monomer is substantially complete, (b) adding one or more conjugated diene monomers and polymerizing until substantially complete conversion of monomer(s) to polymer has taken place, and (c) reacting the resulting block copolymer from said steps (a) and (b) by ring-opening coupling with a compound of the general formula:

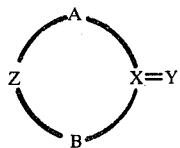

wherein, Z is a 1,2-phenylene, 1,2-cyclohexylene, or

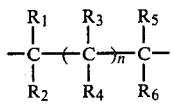

grouping wherein $n=0$ or 1 and $R_1$, $R_2$, $R_3$, $R_4$, $R_5$ and $R_6$ are the same or different and are selected from hydrogen or a hydrocarbyl group containing 1 to 12 carbon atoms and A, B and Y are oxygen or sulfur and X is carbon or sulfur, with the stipulation that when X is sulfur, Y must be oxygen, in an amount of from 0.2 to 3 moles of compound per mole of said organoalkali metal or organomagnesium initiator.

Another aspect of the invention is a process for the preparation of polymers of conjugated dienes of broadened molecular weight distribution and negligible cold flow comprising:

(a) polymerizing a conjugated diene or a mixture of conjugated dienes in the presence of an initiator selected from organoalkali metal or organomagnesium initiators until substantially complete consumption of the monomer(s) and (b) reacting the resulting polymer from said step (a) by ring-opening coupling with a compound of the general formula:

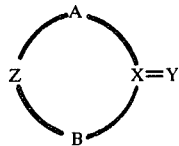

wherein Z is a 1,2-phenylene, 1,2-cyclohexylene, or

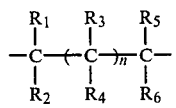

grouping wherein $n=0$ or 1 and $R_1$, $R_2$, $R_3$, $R_4$, $R_5$ and $R_6$ are the same or different and are selected from hydrogen or a hydrocarbyl group containing from 1 to 12 carbon atoms and A, B and Y are oxygen or sulfur and X is carbon or sulfur, with the stipulation that when X is sulfur, Y must by oxygen, in an amount of from 0.2 to 3 moles of the coupling compound per mole of said organoalkali metal or organomagnesium initiator.

Still another aspect of the invention is conjugated diene polymers of broadened molecular weight distribution and negligible cold flow prepared by:

(a) polymerizing at least one conjugated diene in the presence of an initiator selected from organoalkali metal or organomagnesium initiators until the consumption of monomer is substantially complete, (b) reacting the resulting polymer from said step (a) by ring-opening coupling with a compound of the general formula:

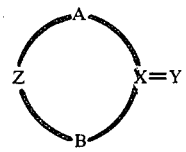

wherein, Z is a 1,2-phenylene, 1,2-cyclohexylene, or

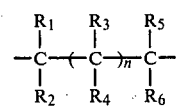

grouping wherein $n=0$ or 1 and $R_1$, $R_2$, $R_3$, $R_4$, $R_5$ and $R_6$ are the same or different and are selected from hydrogen or a hydrocarbyl group containing 1 to 12 carbon atoms and A, B and Y are oxygen or sulfur and X is carbon or sulfur, with the stipulation that when X is sulfur, Y must be oxygen, in an amount of from 0.2 to 3 moles of the coupling compound per mole of said organoalkali metal or organomagnesium initiator.

Also included are block copolymers of vinyl-substituted aromatic compounds and conjugated dienes of broadened molecular weight distribution prepared by:

(a) polymerizing vinyl-substituted aromatic compounds in the presence of an initiator selected from organoalkali metal or organomagnesium initiators until the consumption of monomer is substantially complete, (b) adding one or more conjugated diene monomers and polymerizing until substantially complete conversion of monomer(s) to polymer has taken place, and (c) reacting the resulting block copolymer from said steps (a) and (b) by ring-opening coupling with a compound of the general formula:

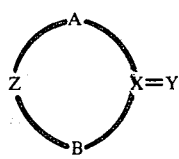

wherein, Z is a 1,2-phenylene, 1,2-cyclohexylene, or

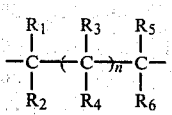

grouping wherein n=0 or 1 and $R_1$, $R_2$, $R_3$, $R_4$, $R_5$ and $R_6$ are the same or different and are selected from hydrogen or a hydrocarbyl group containing from 1 to 12 carbon atoms and A, B and Y are oxygen or sulfur and X is carbon or sulfur, with the stipulation that when X is sulfur, Y must be oxygen, in an amount of from 0.2 to 3 moles of compound per mole of said organoalkali metal or organomagnesium initiator.

It is noteworthy that in our invention for the coupling of "living" block copolymers, the hydrocarbon portion of the "living" chain end is always derived from a conjugated diene.

As is well known in the art, the weight ratio of vinyl-substituted aromatic compound to conjugated diene in the "living" block copolymer can be varied widely, for instance 5:95 to 95:5.

The molecular weight of the non-terminated polymers can be controlled by a judicious selection of the amount of monomers consumed during polymerization and the amount of initiator. The number average molecular weights may vary in the range of 30,000 to 350,000, the preferred range being 60,000 to 200,000.

DETAILED DESCRIPTION OF INVENTION

Generally, the polymers that can be treated by the process of this invention are the "living" polymers of conjugated dienes containing from 4 to 12 carbon atoms, preferably 4 to 8 carbon atoms, such as 1,3-butadiene, isoprene, piperylene, 1,3-hexadiene, 1,3-heptadiene, 1,3-octadiene, 2-ethyl-1,3-butadiene, 2,3-dimethyl-1,3-butadiene, 2-methyl-1,3-octadiene, 2-methyl-1,3-pentadiene, 3-methyl-1,3-pentadiene, 4-methyl-1,3-pentadiene, 4-methyl-1,3-heptadiene, 2-phenyl-1,3-butadiene and the like. Mixtures of dienes may also be used. The conjugated dienes can be polymerized alone or in mixtures with vinyl-substituted aromatic compounds to form homopolymers, copolymers or block copolymers. Block copolymers can be formed by sequentially polymerizing a vinyl-substituted aromatic compound with an organoalkali metal compound and then adding a conjugated diene compound to produce a block copolymer having a terminal carbonalkali metal bond which can be subsequently reacted with a coupling agent. Vinyl-substituted aromatic compounds containing 8 to 16 carbon atoms, preferably 8 to 12 carbon atoms, can be polymerized with the dienes. Examples of vinyl-substituted aromatic compounds are styrene, α-methylstyrene, p-isopropyl-α-methylstyrene, vinyl toluene, 3-methylstyrene, chlorostyrene, 4-cyclohexylstyrene, 4-p-tolylstyrene, 1-vinylnaphthalene, 2-vinylnaphthalene and the like.

The polymers are prepared by contacting the monomer or monomers in an inert solvent with an organoalkali metal or organomagnesium compound. One of the preferred classes of these compounds can be represented by the formula RLi, wherein R is a hydrocarbon radical selected from the group consisting of aliphatic, cycloaliphatic, and aromatic radicals containing from 1 to 20 carbon atoms. Examples of these initiators are methyllithium, n-butyllithium, secbutyllithium, tert-butyllithium, n-decyllithium, phenyllithium, cyclohexyllithium, p-tolyllithium, n-eicosyllithium, and the like.

Another class of initiators is the dilithium initiators, such as DiLi-1 ™ and DiLi-3 ™ (Trademarks of Lithium Corporation), 1,4-dilithio-1,1,4,4-tetraphenylbutane, 1,4-dilithio-1,4-dimethyl-2-butene and the like.

Examples of other initiators which are useful in this invention are: sodium naphthalene, sodium biphenyl, benzyl sodium, cumyl potassium, cumyl cesium and cumyl rubidium. When employing organosodium, organopotassium, organocesium and organorubidium initiators, it is preferable to use them in an ether solvent such as tetrahydrofuran to avoid side reactions.

It has been found (U.S. Pat. No. 3,822,219) that dialkylmagnesium compounds in combination with organoalkali metal compounds in hydrocarbon solvents catalyze the polymerization of conjugated dienes to predictable molecular weights. Some examples are: $n-C_4H_9MgC_2H_5$—RM and $(n-C_6H_{13})_2$—Mg—RM, where M is an alkali metal such as lithium, sodium or potassium, and R is an alkyl or aryl group.

The amount of initiator used varies, depending upon the desired molecular weight of the end product. The polymers are normally prepared at a temperature in the range between −100° and +150° C., preferably −75° and +75° C. It is preferred to carry out the polymerization in the presence of a suitable inert solvent, for instance, a hydrocarbon diluent such as benzene, cyclohexane, cyclopentane, n-pentane, hexane, heptane, octane, isooctane, and isopentane.

For environmental reasons, it is preferred that benzene be avoided (limitations on exposure to benzene vapors imposed by the Occupational, Safety and Health Administration). Aliphatic and cycloaliphatic solvents are preferred.

The microstructures of the polymers prepared from conjugated dienes may be modified by employing polar compounds, known in the art, during polymerization.

The general class of coupling agents for ring-opening coupling are the cyclic carbonates, thiocarbonates, and sulfites of the general formula:

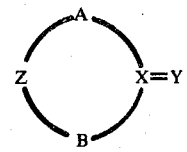

wherein, Z is a 1,2-phenylene, 1,2-cyclohexylene, or

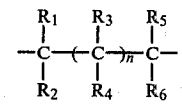

grouping wherein n=0 or 1 and $R_1$, $R_2$, $R_3$, $R_4$, $R_5$ and $R_6$ are the same or different and are selected from hydrogen or a hydrocarbyl group containing from 1 to 12 carbon atoms and A, B and Y are oxygen or sulfur and X is carbon or sulfur, with the stipulation that when X is sulfur, Y must be oxygen. Examples of the compounds belonging to this class include ethylene carbonate, propylene carbonate, o-phenylene carbonate, 1,2-cyclohexylene carbonate, ethylene trithiocarbonate, O,O-ethylene monothiocarbonate, O,S-ethylene monothiocarbonate, O,S-ethylene dithiocarbonate, S,S-ethylene dithiocarbonate, ethylene sulfite, propylene sulfite, o-phenylene sulfite, 1,2-cyclohexylene sulfite, and mixtures thereof.

The amount of a coupling agent used may be expressed in relation to the amount of polymerization initiator used above the scavenger level, which theoretically corresponds to the number of live polymer ends present in the solution. Generally, the molar ratios of a coupling agent to carbon-metal bond, for instance, carbon-lithium bond, useful in this invention are from 0.05:1 to 5:1, preferably 0.2:1 to 3:1.

The coupling agent may be used neat or dissolved in an inert solvent. The ring-opening coupling reaction is normally carried out with the solution containing nonterminated polymer. However, for convenience and other considerations, the solution may be further diluted with the solvent used during polymerization or with another desirable inert solvent.

The ring-opening coupling reaction may be carried out under atmospheric, subatmospheric or supraatmospheric pressures. The reaction temperature may be varied over a wide range, for instance, from about −50° to about 200° C. It has been found that a temperature of 0° to 100° C. is convenient for carrying out the ring-opening coupling reaction.

Cold flow was measured by extruding the polymer through a 1/16 inch orifice under constant pressure at a temperature of 122° F. After allowing 10 minutes at 122° F. to reach steady state, the rate of extrusion was measured by weighing the amount of polymer extruded in 30 minutes and recording the values in milligrams per minute.

BEST MODE OF THE INVENTION

The practice of this invention is illustrated by reference to the following examples which are intended to be representative rather than restrictive of its scope.

EXAMPLE I

To each of ten 8-oz. bottles under nitrogen, 7.3 g (0.135 mole) 1,3-butadiene, 139 ml. benzene, and 0.075 millimoles sec-butyllithium above the scavenger level were added. After polymerization for 24 hours at 25° C., the specified amount of a coupling agent (Table I) was added, and the ring-opening reaction allowed to continue at 25° C. for 24 hours. The resulting polymer solutions were precipitated in five-times the volume of methanol containing 0.1 percent 2,6-di-tert-butyl-p-cresol stabilizer. The polymers exhibited the data shown in Table I. These data show that a variety of cyclic carbonates and thiocarbonates are effective coupling agents for living polybutadiene.

This also is the case with ethylene sulfite.

TABLE I

| Polymer | Coupling Agent | Molar Ratio Coupling Agent/BuLi | Polymer Conversion, % | Inherent Viscosity,[a] dl/g | Increase in Inherent Viscosity, % | % Gel | $\overline{M}_w$[c] | $\overline{M}_n$[c] | H.I.[d] |
|---|---|---|---|---|---|---|---|---|---|
| 1 | none | 0 (control) | 86 | 1.25 | — | 0 | 200,000 | 140,000 | 1.42 |
| 2 | Ethylene carbonate | 0.333 | 84 | 1.40 | 12 | 0 | | | |
| 3 | Ethylene carbonate | 0.50 | 86 | 1.65 | 32 | 0 | | | |
| 4 | Ethylene carbonate | 1.0 | 82 | 1.64 | 31 | 0 | | | |
| 5 | Ethylene carbonate | 0.50[b] | 86 | 1.85 | 48 | 0 | | | |
| 6 | O,S-Ethylene monothiocarbonate | 0.333 | 86 | 1.97 | 58 | 0 | 331,000 | 217,000 | 1.53 |
| 7 | O,S-Ethylene monothiocarbonate | 0.50 | 86 | 1.70 | 36 | 0 | 273,000 | 194,000 | 1.41 |
| 8 | O,S-Ethylene monothiocarbonate | 1.0 | 87 | 1.65 | 32 | 0 | 258,000 | 170,000 | 1.52 |
| 9 | Ethylene trithiocarbonate | 0.50 | 86 | 1.60 | 28 | 0 | | | |
| 10 | Ethylene sulfite | 0.50 | 84 | 1.65 | 32 | 0 | | | |

[a]Toluene solvent, 30° C.
[b]After coupling agent was added, the reaction was allowed to continue at 50° C. for 24 hours.
[c]Determined by gel permeation chromatography in tetrahydrofuran solvent.
[d]Heterogeneity Index, $\overline{M}_w/\overline{M}_n$ O,S-Ethylene monothiocarbonate 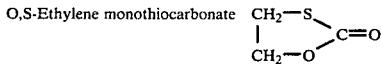

Ethylene trithiocarbonate 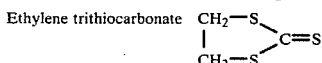

Ethylene Sulfite 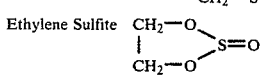

EXAMPLE II

In a manner similar to Example I, 8.9 g. (0.165 mole) 1,3-butadiene and 185 ml. of cyclohexane were added to each of four bottles. After scavenging impurities with sec-butyllithium, a solution of 2.5 g. of nonterminated lithium polystyrene in cyclohexane (number average molecular weight 12,500 and prepared by polymerizing styrene with sec-butyllithium) was added to each butadiene solution. The polymerizations were allowed to proceed at 50° C. for 17 hours. To the resulting nonterminated lithium styrene-butadiene block copolymers were added the specified amounts of coupling agents (Table II), and the ring-opening reactions allowed to proceed at 50° C. for 6 hours. After isolation and drying, the polymers exhibited the data shown in Table II. These examples illustrate coupling of a block copolymer containing living polybutadiene block with ring-opening coupling agents, thereby resulting in greatly broadened molecular weight distribution.

TABLE II

| Polymer | Coupling Agent | Molar Ratio Coupling Agent/ Lithium Polystyrene | Polymer Conversion, % | Inherent Viscosity,[a] dl/g | Increase in Inherent Viscosity, % | % Gel[a] | $\overline{M}_w$[b] | $\overline{M}_n$[b] | H.I.[c] | Cold Flow Index, mg/min. |
|---|---|---|---|---|---|---|---|---|---|---|
| 11 | none | 0 (control) | 99 | 0.84 | — | 2 | 81,000 | 29,000 | 2.79 | 0.6 |
| 12 | O,S-Ethylene monothiocarbonate | 0.5 | 99 | 1.34 | 60 | 0 | 106,000 | 26,000 | 4.17 | 0 |
| 13 | Ethylene carbonate | 0.5 | 94 | 1.64 | 95 | 0 | 187,000 | 31,000 | 6.03 | 0 |
| 14 | Ethylene sulfite | 0.5 | 94 | 1.07 | 23 | 0 | — | — | — | — |

[a]toluene solvent, 30° C.
[b]Determined by gel permeation chromatography in tetrahydrofuran.
[c]Heterogeneity Index, Mw/Mn.

While certain representative embodiments and details have been shown for the purpose of illustrating the invention, it will be apparent to those skilled in this art that various changes and modifications may be made therein without departing from the spirit or scope of the invention.

We claim:

1. A process for the preparation of block copolymers of vinyl-substituted aromatic compounds and conjugated dienes of broadened molecular weight distribution comprising:

(a) polymerizing vinyl-substituted aromatic compounds in the presence of initiator selected from organoalkali metal or organomagnesium initiators until the consumption of monomer is substantially complete, (b) adding one or more conjugated diene monomers and polymerizing until substantially complete conversion of monomer(s) to polymer has taken place, and (c) reacting the resulting block copolymer from said steps (a) and (b) by ring-opening coupling with a compound of the general formula:

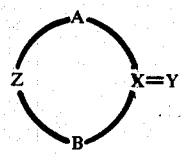

wherein, Z is a 1,2-phenylene, 1,2-cyclohexylene, or

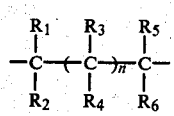

grouping wherein n=0 or 1 and $R_1$, $R_2$, $R_3$, $R_4$, $R_5$ and $R_6$ are the same or different and are selected from hydrogen or a hydrocarbyl group containing 1 to 12 carbon atoms and A, B and Y are oxygen or sulfur and X is carbon or sulfur, with the stipulation that when X is sulfur, Y must be oxygen, in an amount of from 0.2 to 3 moles of compound per mole of said organoalkali metal or organomagnesium initiator.

2. The process according to claim 1, wherein in the first step (a) the monomer is selected from the group consisting of styrene, α-methylstyrene, p-isopropyl α-methylstyrene, vinyl toluene, chlorostyrene, 1-vinylnaphthalene, 2-vinylnaphthalene, and the initiator is an organolithium or organosodium compound and in the second step (b) the diene monomer is selected from the group consisting of 1,3-butadiene, isoprene, piperylene, 2-ethyl-1,3-butadiene, and 2,3-dimethylbutadiene.

3. The process according to claim 1, wherein in the first step (a) the initiator is an organolithium compound and in the third step (c) the coupling agent is selected from the group consisting of ethylene carbonate, propylene carbonate, O,O-ethylene monothiocarbonate, O,S-ethylene monothiocarbonate, O,S-ethylene dithiocarbonate, S,S-ethylene dithiocarbonate, ethylene trithiocarbonate, ethylene sulfite, propylene sulfite, o-phenylene carbonate, 1,2-cyclohexylene carbonate, 1,2-cyclohexylene sulfite, and o-phenylene sulfite.

4. A process according to claim 1 wherein the organolithium initiator is selected from the group consisting of n-butyllithium, sec-butyllithium, phenyllithium, 1,4-dilithio-1,1,4,4-tetraphenylbutane, 1,4-dilithio-1,4-dimethyl-2-butene, DiLi-1 and DiLi-3.

5. The process according to claim 3 wherein the organolithium initiator is selected from the group consisting of n-butyllithium, sec-butyllithium, phenyllithium, 1,4-dilithio-1,1,4,4-tetraphenylbutane, 1,4-dilithio-1,4-dimethyl-2-butene, DiLi-1 and DiLi-3.

6. The process of claim 1, wherein the vinyl-substituted monomer is styrene, the conjugated diene is butadiene, the polymerization initiator is an organolithium compound, and the coupling agent is selected from the group consisting of ethylene carbonate, O,O-ethylene monothiocarbonate, O,S-ethylene monothiocarbonate, O,S-ethylene dithiocarbonate, S,S-ethylene dithiocarbonate, o-phenylene carbonate, 1,2-cyclohexylene carbonate, ethylene trithiocarbonate, ethylene sulfite, 1,2-cyclohexylene sulfite, o-phenylene sulfite and propylene carbonate.

7. Block copolymers of vinyl-substituted aromatic compounds and conjugated dienes of broadened molecular weight distribution prepared by:

(a) polymerizing a vinyl-substituted aromatic compound in the presence of an initiator selected from organoalkali metal or organomagnesium initiators until the consumption of monomer is substantially complete, (b) adding one or more conjugated diene monomers and polymerizing until substantially complete conversion of monomer(s) to polymer has taken place, and (c) reacting the resulting block copolymer from said steps (a) and (b) by ring-opening coupling with a compound of the general formula:

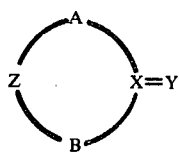

wherein, Z is a 1,2-phenylene, 1,2-cyclohexylene, or

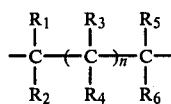

grouping wherein $n=0$ or 1 and $R_1$, $R_2$, $R_3$, $R_4$, $R_5$ and $R_6$ are the same or different and are selected from hydrogen or a hydrocarbyl group containing 1 to 12 carbon atoms and A, B and Y are oxygen or sulfur and X is carbon or sulfur with the stipulation that when X is sulfur, Y must be oxygen, in an amount of from 0.2 to 3 moles of compound per mole of said organoalkali metal or organomagnesium initiator.

8. Block copolymers according to claim 7 wherein in the first step (a) the monomer is selected from the group consisting of styrene, α-methylstyrene, p-isopropyl α-methylstyrene, vinyltoluene, chlorostyrene, 1-vinylnaphthalene, 2-vinylnaphthalene, and the initiator is an organolithium or organosodium compound and in the second step (b) the diene monomer is selected from the group consisting of 1,3-butadiene, isoprene, piperylene, 2-ethyl-1,3-butadiene, and 2,3-dimethylbutadiene.

9. Block copolymers according to claim 7 wherein in the first step (a) the initiator is an organolithium compound and in the third step (c) the coupling agent is selected from the group consisting of ethylene carbonate, propylene carbonate, O,S-ethylene monothiocarbonate, O,S-ethylene dithiocarbonate, S,S-ethylene dithiocarbonate, ethylene trithiocarbonate, O,O-ethylene monothiocarbonate, ethylene sulfite, propylene sulfite, o-phenylene carbonate, 1,2-cyclohexylene carbonate, 1,2-cyclohexylene sulfite and o-phenylene sulfite.

10. Block copolymers according to claim 7, wherein the vinyl-substituted monomer is styrene, the conjugated diene is butadiene, the polymerization initiator is an organolithium compound, and the coupling agent is selected from the group consisting of ethylene carbonate, o-phenylene carbonate, 1,2-cyclohexylene carbonate, O,O-ethylene monothiocarbonate, O,S-ethylene monothiocarbonate, O,S-ethylene dithiocarbonate, S,S-ethylene dithiocarbonate, ethylene trithiocarbonate, ethylene sulfite, 1,2-cyclohexylene sulfite, o-phenylene sulfite and propylene carbonate.

* * * * *